United States Patent
Kim et al.

(10) Patent No.: US 8,238,055 B2
(45) Date of Patent: Aug. 7, 2012

(54) MOTOR AND RECORDING DISC DRIVING DEVICE

(75) Inventors: Bum Cho Kim, Seoul (KR); Sang Jin Park, Gyunggi-do (KR); Jee Ae Noh, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/926,803

(22) Filed: Dec. 9, 2010

(65) Prior Publication Data

US 2012/0014016 A1   Jan. 19, 2012

(30) Foreign Application Priority Data

Jul. 13, 2010   (KR) .................. 10-2010-0067578

(51) Int. Cl.
*G11B 5/54* (2006.01)
(52) U.S. Cl. .................................... 360/99.08
(58) Field of Classification Search ............... 360/99.08; 310/90
See application file for complete search history.

(56) References Cited

U.S. PATENT DOCUMENTS

| | | | |
|---|---|---|---|
| 7,307,364 B2 | 12/2007 | Takehara et al. | |
| 7,372,663 B2 * | 5/2008 | Leblanc et al. | 360/99.08 |
| 7,399,120 B2 | 7/2008 | Yamada | |
| 2002/0181151 A1 * | 12/2002 | Obata et al. | 360/99.08 |
| 2003/0235007 A1 * | 12/2003 | Parsoneault | 360/99.08 |
| 2005/0116564 A1 | 6/2005 | Tokunaga et al. | |
| 2006/0176611 A1 * | 8/2006 | Flores et al. | 360/99.08 |
| 2007/0217064 A1 * | 9/2007 | Wakitani et al. | 360/99.08 |
| 2009/0115277 A1 | 5/2009 | Yajima | |
| 2011/0122529 A1 * | 5/2011 | Hamakawa et al. | 360/99.08 |

FOREIGN PATENT DOCUMENTS

| | | |
|---|---|---|
| JP | 2004-328926 | 11/2004 |
| JP | 2006-353082 | 12/2006 |

OTHER PUBLICATIONS

Korean Office Action issued Aug. 12, 2011 in corresponding Korean Patent Application 10-2010-0067578.

* cited by examiner

*Primary Examiner* — Allen Cao

(57) ABSTRACT

There are provided a motor and a recording disc driving device, which may improve a coupling structure of the motor to enable a magnet provided in a rotor to thereby double as a conventional stopper. The motor may include: a sleeve into which a shaft is rotatably inserted; a sleeve holder including a body part into which the sleeve is inserted, and a flange part protruded from an upper end portion of the body part in an outer diameter direction; a rotor case fastened to an upper end portion of the shaft, and formed such that a cylindrically shaped-rotor main wall is protruded downwardly in an axial direction to receive the flange part; a magnet fastened to a distal end of the rotor main wall so that a part of the magnet is protruded downwardly of the flange part; and a stator fastened to face the magnet, and generating an electromagnetic force.

16 Claims, 3 Drawing Sheets

MOTOR AND RECORDING DISC DRIVING DEVICE

CROSS-REFERENCE TO RELATED APPLICATIONS

This application claims the priority of Korean Patent Application No. 10-2010-0067578 filed on Jul. 13, 2010, in the Korean Intellectual Property Office, the disclosure of which is incorporated herein by reference.

BACKGROUND OF THE INVENTION

1. Field of the Invention

The present invention relates to a motor and a recording disc driving device, and more particularly, to a motor and a recording disc driving device, which may improve a coupling structure of the motor to enable a magnet provided in a rotor to thereby double as a conventional stopper.

2. Description of the Related Art

A small-sized spindle motor used in a recording disc driving device may be a device in which a fluid dynamic pressure-bearing assembly is used, in which oil is disposed between a shaft of the fluid dynamic pressure-bearing assembly and a sleeve thereof, and the shaft is supported by fluid pressure generated by the oil.

The spindle motor may include a stator on which a coil is wound and a rotor rotated by an electromagnetic force that is generated by a voltage applied to the wound coil and by a magnet.

In the related art, in order to prevent the rotor from being lifted to be separated from a main body of the motor such as the stator and the like, when the rotor is rotated at a high speed, a stopper fastened to a rotor case may be provided.

The conventional stopper may be fastened to a distal end of a cylindrically shaped-rotor main wall, which is protruded to receive a part of a sleeve in the rotor case, and may be coupled to the rotor main wall generally using an adhesive or a laser welding scheme.

Since the above described conventional spindle motor may be configured such that many components such as the stator, the rotor, the stopper, and the like are coupled to each other, there is a limitation in minimizing a volume of the motor wholly.

SUMMARY OF THE INVENTION

An aspect of the present invention provides a motor and a recording disc driving device, which may enable a magnet provided in a rotor to double as a conventional stopper, thereby minimizing the number of components of the motor.

According to an aspect of the present invention, there is provided a motor, including: a sleeve into which a shaft is rotatably inserted; a sleeve holder including a body part into which the sleeve is inserted, and a flange part protruded from an upper end portion of the body part in an outer diameter direction; a rotor case fastened to an upper end portion of the shaft, and formed such that a cylindrically shaped-rotor main wall is protruded downwardly in an axial direction to receive the flange part; a magnet fastened to a distal end of the rotor main wall so that a part of the magnet is protruded downwardly of the flange part; and a stator fastened to face the magnet, and generating an electromagnetic force.

At least one of a sealing part may be formed between the sleeve holder and the magnet to prevent leakage of fluid used for lubricating the sleeve from occurring.

The sealing part may be formed between an outer circumferential surface of the body part of the sleeve holder and an inner circumferential surface of the magnet.

The body part of the sleeve holder may be formed to have a shape such that an outer diameter of the body part is increased as the body part is closer to the flange part.

The sealing part may be formed between a lower surface of the flange part of the sleeve holder and an upper surface of the magnet.

At least one of edges of the inner circumferential surface of the magnet facing the sleeve holder may be formed of a curved surface.

The magnet may include a coating layer formed on a surface of the magnet. Here, the surface may face the flange part of the sleeve holder.

The coating layer may be formed by an electro deposition (ED) coating.

The coating layer may be formed by either an electroless nickel plating scheme or an electro nickel plating scheme.

The motor may further include a base formed in the motor, the sleeve holder being fixedly fastened to the base.

The base may include: a sleeve supporting part formed to have a cylindrical shape so that the sleeve holder is fixedly inserted into the sleeve supporting part, and including a stepped part formed on an outer circumferential surface of the sleeve supporting part, the stepped part being shaped to conform to an outer contour of the magnet; and a plate part extended from the sleeve supporting part in an outer diameter direction and having a circuit board attached to a surface thereof, wherein the circuit board is electrically connected to the stator.

The motor may further include a pulling plate fastened to the stepped part of the sleeve supporting part, and generating an attraction force mutually exerted between the magnet and the pulling plate.

The base may further include a stator seating part protruded upwardly in the axial direction from the plate part, so that the stator is fixedly seated on the stator seating part.

The sleeve supporting part may include a stator seating part protruded upwardly in the axial direction along an outer diameter of the stepped part, so that the stator is seated on and fixed to the stator seating part.

According to another aspect of the present invention, there is provided a recording disc driving device, including: any one of the above motors; a head transfer part transferring, to a recording disc, a head for detecting information on the recording disc loaded in the motor; and a housing receiving the motor and the head transfer part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
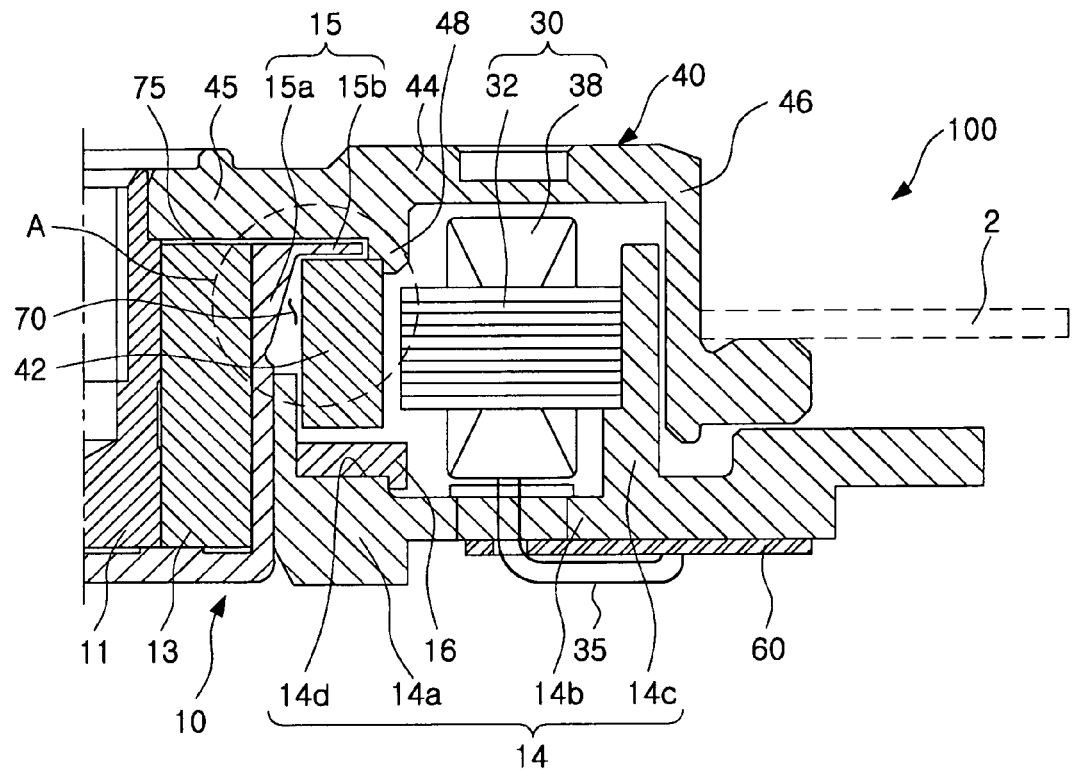
FIG. 1 is a schematic cross-sectional view showing a motor according to an exemplary embodiment of the present invention.

Before describing the detailed description of the present invention, the terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept implied by the term to best describe the method he or she knows for carrying out the invention. Therefore, the exemplary embodiments detailed in the detailed description and the configurations in the drawings are merely exemplary embodiments of the present invention and do not represent all of the technical ideas of the present invention. Therefore, it should be understood that there may be various equivalents and modifications capable of replacing them at the time of filing.

Hereinafter, exemplary embodiments of the present invention will be described in detail with reference to the accompanying drawings. Like reference numerals in the drawings denote like elements throughout the specification. In addition, in describing the present invention, a detailed description of related known functions or configurations will be omitted so as not to obscure the subject of the present invention. Based on the same reason, in the drawings, some of components are exaggerated or omitted or are schematically illustrated, and a size of each component does not completely reflect the actual size thereof.

Meanwhile, terms relating to directions will be defined as follows. As shown in FIG. 1, an axial direction denotes a vertical direction with respect to a shaft 11, and outer and inner diameter directions denote an outside edge direction of a rotor 40 with respect to the shaft 11 and a central direction of the shaft 11 with respect to an outside edge of the rotor 40, respectively.

Exemplary embodiments of the present invention will now be described in detail with reference to the accompanying drawings.

Figure 2:
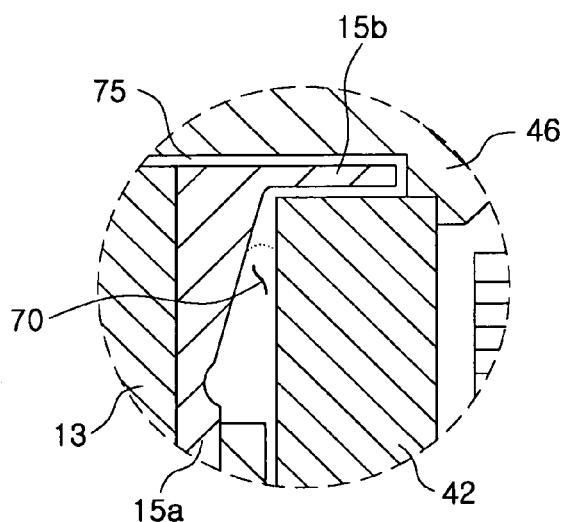
FIG. 2 is an enlarged cross-sectional view of "A" of FIG. 1.

FIG. 1 is a schematic cross-sectional view showing a motor according to an exemplary embodiment of the present invention, and FIG. 2 is an enlarged cross-sectional view of "A" of FIG. 1.

Referring to FIGS. 1 and 2, a motor 100 according to the present exemplary embodiment may be a spindle motor 100 applied to a hard disk drive (HDD), and include a bearing assembly 10, a stator 30, and a rotor 40.

The bearing assembly 10 may include a shaft 11, a sleeve 13, and a base 14 to which a circuit board 60 is attached.

The shaft 11 may form a rotating shaft of the rotor 40, which will be described later.

The sleeve 13 may be a rotation support member supporting the shaft 11. The sleeve 13 may be formed to have a cylindrical shape, and the shaft 11 may be rotatably inserted into a hole in an inside of the sleeve 13.

The motor 100 according to the present exemplary embodiment may use a fluid dynamic pressure bearing. Accordingly, in the motor 100 according to the present exemplary embodiment, fluid may be disposed between the sleeve 13 and the shaft 11 so that the shaft 11 may be readily rotated in the inside of the sleeve 13. The fluid may act as a lubricant minimizing friction between the shaft 11 and the sleeve 13 when the shaft 11 is rotated.

In addition, the motor 100 according to the present exemplary embodiment may include a plurality of radial dynamic pressure holes (not shown) generating a fluid dynamic pressure formed on a side of an outer circumferential surface of the shaft 11 or an inner circumferential surface of the sleeve 13. The shaft 11 may be readily rotated within the sleeve 13 by the fluid dynamic pressure generated by the plurality of radial dynamic pressure holes.

The sleeve holder 15 may include a cylindrically shaped-body part 15a and a flange part 15b.

The body part 15a may receive the sleeve 13 and the shaft 11 therein. An outer circumferential surface of the body part 15a may be press-fitted to and fixed to an inside of the base 14, a process which will be described later. Also, the body part 15a according to the present exemplary embodiment may be formed to have a shape such that an outer diameter of the body part 15a is increased as the body part 15a is closer to the flange part 15b. That is, the body part 15a according to the present exemplary embodiment may be formed to have an inclined surface such that the outer diameter of the body part 15a is gradually increased as an outer circumferential surface of the body part 15a facing a magnet 42, which will be described later, is closer to an upper side of the magnet 42 in an axial direction. Accordingly, a gap between the outer circumferential surface of the body part 15a and the magnet 42 may be significantly small in a portion adjacent to the flange part 15b, and the gap between the outer circumferential surface of the body part 15a and the magnet 42 may be gradually increased as the outer circumferential surface of the body part 15a is closer to a lower side of the magnet 42 in the axial direction.

A shape of the body part 15a may be utilized in forming a sealing part 70 using a gap between the body part 15a and the magnet 42, and further descriptions will be made in descriptions of the magnet 42, which will be made later.

A portion of the flange part 15b that is received in an upper end portion of the body part 15a, that is, a rotor main wall 48, which will be described later, may be protruded in an outer diameter direction. Thus, a gap created between an upper surface of the flange part 15b and a lower surface of the rotor case 44 may be formed to be a path 75 (hereinafter, referred to as fluid movement path) through which fluid is moved. The fluid movement path 75 may be used as a path in which fluid injected in between the sleeve 13 and the shaft 11 flows to be moved when the fluid is expanding.

Also, the flange part 15b may prevent the protruded magnet 42 from being upwardly lifted in a space below the flange part 15b, and therefore the rotor 40 may be prevented from being upwardly lifted at the time of rotation of the rotor 40.

The base 14 may be a support member supporting overall components of the motor, and include a sleeve supporting part 14a, a plate part 14b, and a stator seating part 14c.

The sleeve supporting part 14a may be formed to have a cylindrical shape, and the sleeve holder 15 may be fixedly inserted into the sleeve supporting part 14a. That is, the sleeve supporting part 14a may rotatably support the shaft 11 using the sleeve holder 15 as a mediator. Also, the sleeve supporting part 14a may include a stepped part 14d formed on an outer circumferential surface of the sleeve supporting part 14a, and the stepped part 14c may be partially protruded in the outer diameter direction to conform to an outer contour of the magnet 42 fastened to the rotor main wall 48.

The plate part 14b may be extended from the sleeve supporting part 14a in the outer diameter direction, and may have a circuit board 60, which will be described later, attached to a surface of the plate part 14b, that is, a lower surface of the plate part 14b.

The stator seating part 14c may be protruded from the plate part 14b upwardly in the axial direction, and the stator 30 may be seated on and fixedly fastened to an upper end portion of the stator seating part 14c. In this instance, the stator seating part 14c according to the present exemplary embodiment may support the stator 30 along an outer diameter of a core 32.

A pulling plate 16 may be fastened to an upper side portion of the stepped part 14d formed in the sleeve supporting part 14a. The pulling plate 16 may be formed of soft magnetic materials such as iron, silicon, steel, and the like, and may prevent the rotor 40 from being lifted at the time of rotation of the rotor 40, using an attraction force mutually exerted between the magnet 42 and the pulling plate 16.

A circuit pattern (not shown) applying power to the motor 100 may be formed in an inside of the circuit board 60, and may be electrically connected to a winding coil 38 to apply the power to the winding coil 38. Also, a ground pattern among the circuit patterns of the circuit board 60 may be formed to be in electrical conduction connection with the base 14. As the circuit board 60, various boards such as a general printed circuit board (PCB), a flexible PCB, and the like may be selectively used, as necessary.

The stator 30 may include a core 32 and the winding coil 38 wound around an outer circumferential surface of the core 32, and may be a fixed structure received inside the rotor 40. The motor 100 according to the present exemplary embodiment may be an inner rotor in which the stator 30 is disposed outside of the magnet 42 of the rotor 40. Accordingly, the stator 30 according to the present exemplary embodiment may be disposed in such a manner as to receive the magnet 42 therein.

The core 32 may be formed of a plurality of iron plates laminated to one another, and may be fixedly fastened to the stator seating part 14c of the base 14.

The winding coil 38 may be a coil 34 wound around the core 32, and may generate an electromagnetic force when power is applied thereto. The winding coil 38 according to the present exemplary embodiment may be electrically connected to the circuit board 60 through a lead line 35 and thus, external power may be supplied. However, the present invention is not limited thereto, the winding coil 38 may be used in various manners as long as the winding coil has a configuration in which the circuit board 60 and the winding coil 38 are electrically connected to each other.

The rotor 40 may include the rotor case 44 and the magnet 42.

The rotor case 44 may include a rotor hub 45, a skirt part 46, and a rotor main wall 48.

The rotor hub 45 may be fastened to the upper end portion of the shaft 11.

The skirt part 46 may be extended from the rotor hub 45, and be formed to have a cup shape receiving the stator 30 therein. When the motor 100 according to the present exemplary embodiment is used in a recording disc driving device 1 of FIG. 5, a recording disc 2 may be loaded onto an outer circumferential surface of the skirt part 46.

The rotor main wall 48 may be formed to have a cylindrical shape to be protruded from a side of the rotor case 44, that is, a lower surface of the rotor case 44 in a vertical direction, and may be formed in such a manner as to receive a part of the sleeve holder 15, that is, the flange part 15b of the sleeve holder 15, therein. In this instance, a gap between the flange part 15b and the rotor main wall 48 may be formed as the fluid movement path 75.

In addition, the magnet 42, which will be described later, may be fastened to a distal end of the rotor main wall 48 according to the present exemplary embodiment.

The magnet 42 may be an annular ring-shaped permanent magnet that generates a magnetic force of a predetermined intensity such that an N-pole and an S-pole are alternately magnetized in a circumferential direction. The magnet 42 may be fastened to the distal end of the rotor main wall 48, and may be disposed to face the core 32 of the stator 30, which will be described later. Accordingly, when power is applied to the winding coil 38 wound around the core 32, the rotor 40 may be rotated by electromagnetic interaction between the magnet 42 and the winding coil 38.

The magnet 42 according to the present exemplary embodiment may be formed to have a circular ring shape, and its cross-section may be formed to have a quadrilateral shape. Also, the magnet 42 may be fastened to the distal end of the rotor main wall 48 so that a part of the magnet 42 is protruded downwardly of the flange part 15b. Accordingly, since the magnet 42 is brought into contact with a lower surface of the flange part 15b when the rotor 40 is lifted at the time of rotation of the rotor 40, the magnet 42 may act as a stopper preventing the rotor 40 from being lifted.

In addition, by a configuration in which the magnet 42 is protruded downwardly of the flange part 15b, a gap between the magnet 42 and the lower surface of the flange part 15b may be formed in such a manner that the fluid movement path 75 created between the upper surface of the flange part 15b and the lower surface of the rotor case 44 is extended. The sealing part 70 may be formed in an end of the fluid movement path 75.

The sealing part 70 may be used for preventing fluid flowing in the fluid movement path 75 from being leaked to an outside of the fluid movement path 75, and the motor 100 according to the present exemplary embodiment may include at least one sealing part 70 formed between the sleeve holder 15 and the magnet 42.

In particular, the sealing part 70 according to the present exemplary embodiment may be formed by a gap between an outer circumferential surface of the body part 14a and an inner circumferential surface of the magnet 42.

As, described above, the gap between the outer circumferential surface of the body part 14a of the sleeve holder 15 according to the present exemplary embodiment and the inner circumferential surface of the magnet 42 may be gradually increased as being closer to the lower side of the magnet 42 in the axial direction. Accordingly, when fluid leaked through the fluid movement path 75 arrives at the sealing part 70, an interface (dotted line of FIG. 2) of the fluid may be created by the increased gap of the sealing part 70 to thereby perform a sealing operation (or taper-sealing operation) on the fluid.

Meanwhile, according to the present exemplary embodiment, an example in which only a single sealing part 70 is formed is described; however, the present invention is not limited thereto. Thus, various applications may be possible, such as a configuration in which a plurality of sealing parts 70 may be formed by forming a stepped part formed on an outer circumferential surface of the sleeve holder 15.

In addition, as described above, the upper surface of the magnet 42 according to the present exemplary embodiment may be used as the fluid movement path 75. Accordingly, in order to prevent the magnet 42 from being damaged due to contact between the fluid and the magnet 42, it may be possible to form a coating layer (not shown) on the outer circumferential surface of the magnet 42. The coating layer may be formed on a surface (that is, an upper surface) of the magnet 42 facing the flange part 15b of the sleeve holder 15; however, the present invention is not limited thereto. Thus, the coating layer may be formed on the entire outer circumferential surface of the magnet 42.

In addition, the coating layer may be formed by an electro deposition (ED) coating scheme; however, the present invention is not limited thereto. Thus, various schemes such as an electroless nickel plating scheme or an electro nickel plating scheme may be used.

The motor 100 according to the present exemplary embodiment configured as above may be an inner rotor type of motor, and the magnet 42 may be fastened to the rotor main wall 48. The magnet 42 may act as a stopper preventing the rotor 40 from being lifted, as well as generate an electromagnetic force by an interaction between the magnet 42 and the stator 30.

Accordingly, in the motor 100 according to the present exemplary embodiment, components provided in the conventional motor may be omitted, thereby minimizing a manufacturing process, reducing manufacturing costs, and minimizing a volume of the motor 100.

In addition, in the motor 100 according to the present exemplary embodiment, the stator 30 may be disposed outside the magnet 42, thereby increasing an area of the core 32 as necessary, or readily increasing the number of times the winding coil 38 is wound.

The motor 100 according to the present exemplary embodiment is not limited to the above described exemplary embodiments, and may be configured in various manners.

Figure 3:
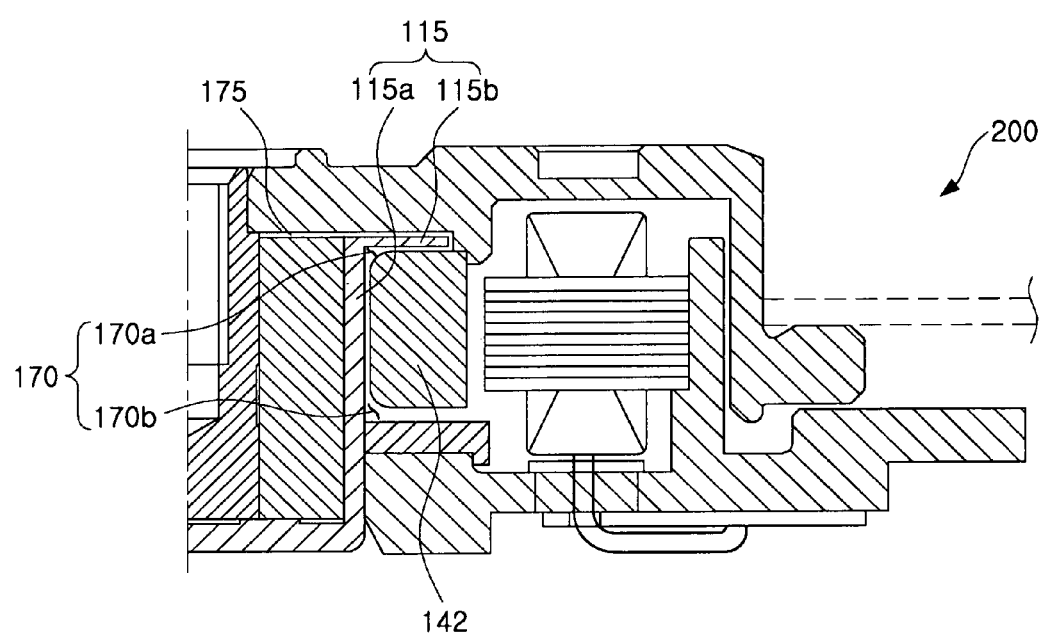
FIG. 3 is a schematic cross-sectional view showing a motor according to another exemplary embodiment of the present invention.

FIG. 3 is a schematic cross-sectional view showing a motor according to another exemplary embodiment of the present invention.

A motor 200 according to the present exemplary embodiment may be configured as having a structure similar to that of the motor 100 of FIG. 1, and a difference therebetween may be shown only in structures of a sleeve holder 115 and a magnet 142. Accordingly, detailed descriptions of the same components will be omitted, and further descriptions will be made focusing on the structures of the sleeve holder 115 and the magnet 142.

Referring to FIG. 3, the sleeve holder 115 of the motor 200 according to the present exemplary embodiment may include a body part 115a and a flange part 115b in a similar manner to that of the above described exemplary embodiment, however, a difference between the above described sleeve holder 15 of FIG. 1 and the sleeve holder 115 according to the present exemplary embodiment may be shown in that an outer circumferential surface of the body part 115a may be formed to have an entirely even outer diameter.

In addition, the magnet 142 according to the present exemplary embodiment may be formed to have a circular ring shape, and its cross-section may be formed to have a quadrilateral shape; however, a difference between the magnet 142 according to the present exemplary embodiment and the magnet 42 of FIG. 1 may be shown in that at least one of edges positioned to be adjacent to the sleeve holder 115 may be formed of a curved surface. The reason the edge is formed of the curved surface may be to form a sealing part 170, which will be described later, and this will be described later.

The sleeve holder 115 according to the present exemplary embodiment may be formed to have an entirely even outer diameter without the stepped part formed on the outer circumferential surface of the sleeve holder 115. Accordingly, the entire inner circumferential surface of the magnet 142 according to the present exemplary embodiment may be disposed to be significantly adjacent to the outer circumferential surface of the sleeve holder 115. In this instance, a gap created between the inner circumferential surface of the magnet 142 and the outer circumferential surface of the sleeve holder 115 may be formed in such a manner that a fluid movement path 175 created between an upper surface of the magnet 142 and a lower surface of the flange part 114b is extended.

In addition, in the motor 200 according to the present exemplary embodiment, the edge of the magnet 142 may be formed of the curved surface, so that a gap between the sleeve holder 115 and the magnet 142 may be increased at the edge of the magnet 142. Accordingly, a gap between the edge of the magnet 142 formed of the curved surface and the sleeve holder 115 may be used as the sealing part 170.

Two edges of the magnet 142 according to the present exemplary embodiment positioned to be adjacent to the sleeve holder 115 may be formed of a curved surface. Accordingly, the motor 200 according to the present exemplary embodiment may include two sealing parts 170.

A sealing part 170a (hereinafter, referred to as a first sealing part) formed on an upper end of the inner circumferential surface of the magnet 142 may be formed by a gap between the lower surface of the flange part 115b of the sleeve holder 115 and the upper surface of the magnet 142. Also, a sealing part 170b (hereinafter, referred to as a second sealing part) formed on a lower end of the inner circumferential surface of the magnet 142 may be formed by a gap between the outer circumferential surface of the sleeve holder 115 and the inner circumferential surface of the magnet 142.

In the case of the motor 200 according to the present exemplary embodiment configured as above, the fluid movement path 175 may be formed to be longer than that of the motor 100 according to the above described exemplary embodiment, and the two sealing parts 170 may be provided, such that fluid may be more effectively prevented from being leaked to the outside when the fluid is expanding.

Figure 4:
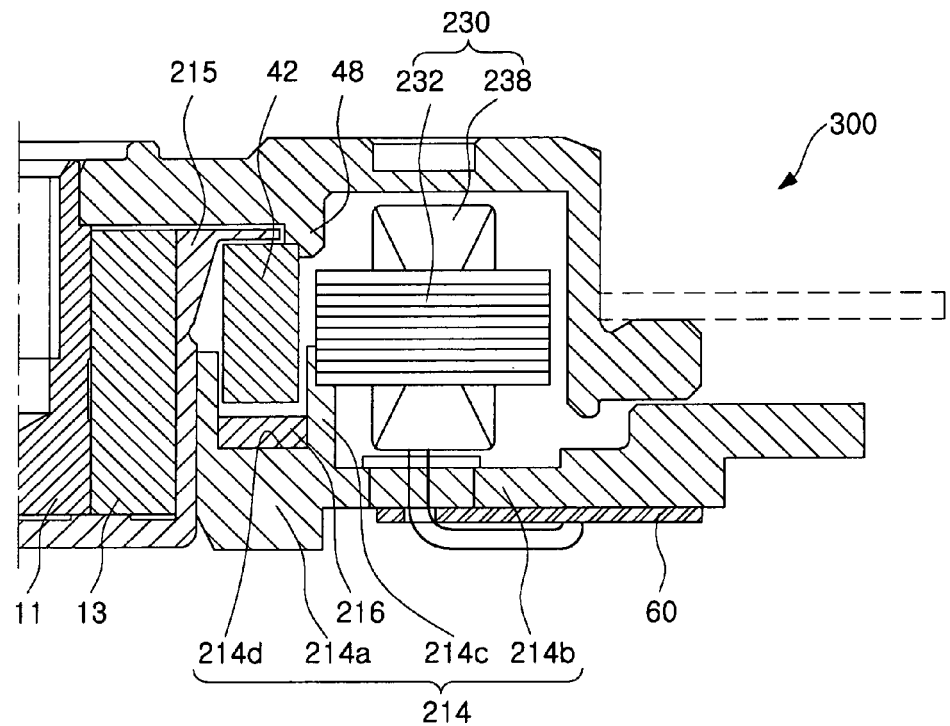
FIG. 4 is a schematic cross-sectional view showing a motor according to another exemplary embodiment of the present invention.

FIG. 4 is a schematic cross-sectional view showing a motor according to another exemplary embodiment of the present invention.

A motor 300 according to the present exemplary embodiment may be configured as having a structure similar to that of the motor 100 of FIG. 1, and a difference therebetween may be shown only in a coupling structure of a base 214 and a stator 230. Thus, detailed descriptions of the same components will be omitted, and further descriptions will be made focusing on the coupling structure of the base 214 and the stator 230.

Referring to FIG. 4, the base 214 of the motor 300 according to the present exemplary embodiment may include a sleeve supporting part 214a supporting the shaft 11 to be rotatable using the sleeve holder 15 as a mediator, and a plate part 214b at its lower surface to which the circuit board 60 is attached.

Here, the motor 300 according to the present exemplary embodiment may have a difference from the above described motors 100 and 200 in that the stator seating part 214c may be extended from the sleeve supporting part 214a without being protruded from the upper surface of the plate part 214b.

The sleeve supporting part 214a of the base 214 according to the present exemplary embodiment may be formed to have a cylindrical shape, and the sleeve 13 may be fixedly inserted therein. Also, a stepped part 214d may be formed on an outer circumferential surface of the sleeve supporting part 214a, and may be partially protruded in an outer diameter direction to conform to an outer contour of the magnet 42 fastened to the rotor main wall 48.

In addition, the sleeve supporting part 214a according to the present exemplary embodiment may include a stator seating part 214c protruded upwardly in an axial direction along an outer diameter of the stepped part 214d. The stator 230 may be seated on and fixedly fastened to the stator seating part 214c.

In the motor 300 according to the present exemplary embodiment configured as above, the stator seating part 214c may support the stator 230 along an inner diameter of a core 232 which is different from an outer diameter of the core 232. Accordingly, a space in which the stator 230 is received may be securely obtained, thereby increasing an area of the core 232 as necessary, and readily increasing the number of times the winding coil 238 is wound.

Figure 5:
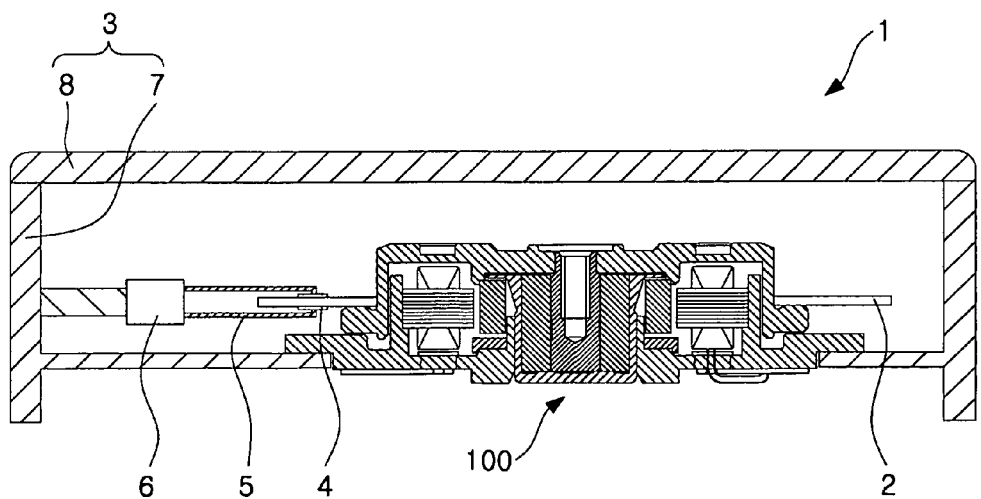
FIG. 5 is a schematic cross-sectional view showing a recording disc driving device in which a motor according to an exemplary embodiment of the present invention is mounted.

FIG. 5 is a schematic cross-sectional view showing a recording disc driving device in which a motor according to an exemplary embodiment of the present invention is mounted.

Referring to FIG. 5, a recording disc driving device 1 according to the present exemplary embodiment may be a hard disc driving device, and may include the motor 100, a head transfer part 6, and a housing 3.

The motor 100 may be any one of the motors 100, 200, and 300 according to exemplary embodiments of the present invention, and a recording disc 2 may be loaded onto the rotor case.

The head transfer part 6 may transfer, to a surface of the recording disc 2 intended to be detected, a head 4 for detecting information on the recording disc 2 loaded onto the motor 100. The head 4 may be disposed on a support part 5 of the head transfer part 6.

The housing 3 may include a top cover 7 for shielding a motor loaded plate 8 and an upper portion of the motor loaded plate 8 in order to form an inner space receiving the motor 100 and the head transfer part 6.

As set forth, according to exemplary embodiments of the present invention, there are provided the motor and the recording disc driving device, which may enable the magnet provided in the rotor to double as a conventional stopper. Accordingly, the number of components of the motor may be relatively reduced in comparison with a conventional motor, thereby realizing cost reduction and process simplification.

Meanwhile, the motor and the recording disc driving device according to the present invention are not limited to the above described exemplary embodiments, and various changes can be made by those skilled in the art within the sprit and scope of the invention.

For example, according to the above described exemplary embodiments, the flange part may be formed in the sleeve holder, and the magnet may be protruded downwardly of the flange part; however, the present invention is not limited thereto. Thus, it may be possible to configure the motor without the sleeve holder.

That is, the flange part may be formed in the upper end portion of the sleeve, and may be partially protruded in the outer diameter direction, and the magnet may be protruded to a lower space of the protruded part of the sleeve.

In addition, according to exemplary embodiments of the present invention, the motor provided in the recording disc driving device is described; however, the present invention is not limited thereto. Thus, the motor may be applied in various manners as long as including the magnet.

According to exemplary embodiments of the present invention, there is provided an inner rotor type of motor where the magnet is fastened to the rotor main wall, which may generate an electromagnetic force through interaction between the magnet and the stator, and may double as the stopper preventing the rotor from being lifted. Accordingly, the number of components of the motor may be relatively reduced in comparison with a conventional motor, thereby realizing cost reduction and process simplification.

In addition, in the motor according to exemplary embodiments of the present invention, the stator may be disposed outside the magnet, thereby increasing an area of the core as necessary, or readily increasing the number of times the winding coil is wound.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor of a recording disc driving device, comprising:
a sleeve into which a shaft is rotatably inserted;
a sleeve holder including a body part into which the sleeve is inserted, and a flange part protruded from an upper end portion of the body part in an outer diameter direction;
a rotor case fastened to an upper end portion of the shaft, and formed such that a cylindrically shaped-rotor main wall is protruded downwardly in an axial direction to receive the flange part;
a magnet fastened to a distal end of the rotor main wall so that a part of the magnet is protruded downwardly of the flange part; and
a stator fastened to face the magnet, and generating an electromagnetic force.

2. The motor of claim 1, wherein at least one of a sealing part is formed between the sleeve holder and the magnet to prevent leakage of fluid used for lubricating the sleeve from occurring.

3. The motor of claim 2, wherein the sealing part is formed between an outer circumferential surface of the body part of the sleeve holder and an inner circumferential surface of the magnet.

4. The motor of claim 3, wherein the body part of the sleeve holder is formed to have a shape such that an outer diameter of the body part is increased as the body part is closer to the flange part.

5. The motor of claim 2, wherein the sealing part is formed between a lower surface of the flange part of the sleeve holder and an upper surface of the magnet.

6. The motor of claim 5, wherein at least one of edges of the inner circumferential surface of the magnet facing the sleeve holder is formed of a curved surface.

7. The motor of claim 2, wherein the magnet includes a coating layer formed on a surface of the magnet, the surface facing the flange part of the sleeve holder.

8. The motor of claim 7, wherein the coating layer is formed by an electro deposition (ED) coating.

9. The motor of claim 7, wherein the coating layer is formed by either an electroless nickel plating scheme or an electro nickel plating scheme.

10. The motor of claim 1, further comprising a base formed in the motor, the sleeve holder being fixedly fastened to the base.

11. The motor of claim 9, wherein the base includes:
a sleeve supporting part formed to have a cylindrical shape so that the sleeve holder is fixedly inserted into the sleeve supporting part, and including a stepped part formed on an outer circumferential surface of the sleeve supporting part, the stepped part being shaped to conform to an outer contour of the magnet; and
a plate part extended from the sleeve supporting part in an outer diameter direction and having a circuit board attached to a surface thereof, the circuit board being electrically connected to the stator.

12. The motor of claim 10, further comprising a pulling plate fastened to the stepped part of the sleeve supporting part, and generating an attraction force mutually exerted between the magnet and the pulling plate.

13. The motor of claim 10, wherein the base further includes a stator seating part protruded upwardly in the axial direction from the plate part, so that the stator is fixedly seated on the stator seating part.

14. The motor of claim 10, the sleeve supporting part includes a stator seating part protruded upwardly in the axial direction along an outer diameter of the stepped part, so that the stator is seated on and fixed to the stator seating part.

15. A recording disc driving device, comprising:
a motor of claim 1;
a head transfer part transferring, to a recording disc, a head for detecting information on the recording disc loaded in the motor; and
a housing receiving the motor and the head transfer part.

16. A motor of a recording disc driving device, comprising:
a sleeve including a shaft rotatably inserted thereinto and formed with a flange part protruded from an upper end of the sleeve in an outer diameter direction;
a rotor case fastened to an upper end portion of the shaft, and formed such that a cylindrically shaped-rotor main wall is protruded downwardly in an axial direction to receive the flange part of the sleeve;
a magnet fastened to a distal end of the rotor main wall so that a part of the magnet is protruded downwardly of the flange part; and
a stator fastened to face the magnet, and generating an electromagnetic force.

\* \* \* \* \*